United States Patent [19]

Hirabayashi

[11] Patent Number: 5,070,579
[45] Date of Patent: Dec. 10, 1991

[54] CLAMPING BAND

[76] Inventor: Toshihide Hirabayashi, 3308-2, Shimosuwamachi, Suwa-gun Nagano-ken, Japan

[21] Appl. No.: 614,659

[22] Filed: Nov. 15, 1990

[30] Foreign Application Priority Data

Nov. 20, 1989 [JP] Japan .................................. 1-301442

[51] Int. Cl.$^5$ .............................................. B65D 63/02
[52] U.S. Cl. .................................. 24/20 R; 24/20 CW; 24/20 W
[58] Field of Search .............. 24/20 R, 20 CW, 20 W, 24/20 TT, 20 EE, 20 S, 20 LS, 19, 21, 23 W, 23 EE

[56] References Cited

U.S. PATENT DOCUMENTS

| 3,789,463 | 2/1974 | Oetiker | 24/20 CW |
| 4,106,799 | 8/1978 | Oetiker | 24/20 R |
| 4,222,155 | 9/1980 | Oetiker | 24/20 CW |
| 4,299,012 | 11/1981 | Oetiker | 24/20 W |
| 4,622,720 | 11/1986 | Oetiker | 24/20 CW |
| 4,724,583 | 2/1988 | Ojima | 24/20 CW |
| 4,991,266 | 2/1991 | Oetiker | 24/20 CW |

Primary Examiner—Victor N. Sakran
Attorney, Agent, or Firm—Jordan and Hamburg

[57] ABSTRACT

A clamping band equipped with a clamping ear is capable of being reduced in diameter by deforming the clamping ear and of maintaining the reduced-diameter state by the action of a catch section designed to prevent the clamping band from expanding in the direction toward diameter enlargement. With such a structure, the clamping band is not caused to enlarge its diameter even under the action of any force exerted on the member to be clamped in the direction toward expansion, prevents the decrease in sealing ability, and maintains strong clamping force.

5 Claims, 7 Drawing Sheets

CLAMPING BAND

BACKGROUND OF THE INVENTION

The present invention relates to a clamping band capable of clamping a member to be clamped which is a connector for a gas hose, car boot, etc.

Figure 24:
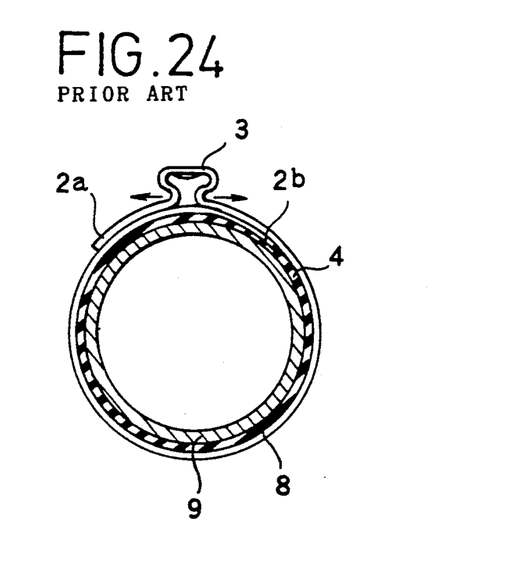
FIG. 24 is an explanatory view illustrating the state of clamping for a conventional clamping band.

FIG. 24 is a drawing illustrating a state of clamping for a conventional clamping band. This clamping band 1 is used when a member 8 to be clamped such as a rubber tubing is connected to a pipe 9.

A band piece 2 is formed in a ring, both ends thereof are overlapped with each other, and on one end section 2a positioned outside, a clamping ear 3 is the form of a gate is formed projecting outwardly. This clamping ear 3 is a known means for diameter reduction called an Octiker ear. The clamping band 1, including the band piece 2 and the clamping ear 3, is made of metal.

When the band piece 2 is wound on a member 8 to be clamped, the other end section 2b of the band piece 2 goes into the inside of the end section 2a with overlapping. In this clamping band 1, the band piece 2 is reduced in diameter by deforming the clamp ear 3 to tightly clamping member 4 to be clamped.

However, since the clamping band 1 is made of metal, a slight return, i.e., spring-back, occurs even the clamping ear 3 has been deformed with a pair of pliers and thus it is impossible to maintain strong clamping over a long term. This spring-back is due to the elasticity inherent in metallic materials, and this property cannot be removed.

The clamping band is for clamping a hose of a material such as rubber, and after clamping a force in the direction toward diameter enlargement is exerted on the clamping band due to the elasticity of the member to be clamped or the pressure of the fluid passing inside the member to be clamped, and thus a long-term use will yield a looseness and result in decrease in sealing capacity. This is because the maintenance of the clamping state of the clamping band depending upon the elastic deformation of the clamping ear.

OBJECT AND SUMMARY OF THE INVENTION

Under the above-stated situation, an object of the present invention is to provide a clamping band which, though having a clamping ear, is capable of more complete clamping of a member to be clamped such as hose.

A metallic clamping band of the invention comprises a band portion formed in a ring with both ends thereof overlapped with each other over a prescribed range, the end of the outer band section of the overlapped section is attached to the inner band section, a clamping ear provided in the mid section of the outer band section and bent outwardly in a form of a gate, a catch section provided between a first position on the band portion which is closer to the end than the clamping ear on the inner band section and a second position on the outer band section corresponding to the first position, the catch section permitting the part of the band portion corresponding to the overlapped section to deviate in the direction toward diameter reduction and preventing deviation in the direction toward diameter enlargement when the clamping ear is deformed to reduce the diameter of the band portion.

Also a metallic clamping band of the invention comprises a band portion formed in a ring, a clamping portion attached to and bridged over the outer face of each end of the band portion, a clamping ear provided in the mid section of the overlapped section in one end section of the band portion and bent outwardly in a form of a gate, a catch section provided between a first position on the one end section of the band portion which is closer to the end than the clamping ear and a second position corresponding to the clamping portion overlapped on the first position, the catch section permitting the band portion to deviate in the direction toward diameter reduction and preventing deviation in the direction toward diameter enlargement when the clamping ear is deformed to reduce the diameter of the band portion.

As is clear from the above description, since in the clamping band of the present invention, the state of diameter reduction is designed to be maintained without reliance on the clamping ear after the clamping ear has been deformed to effect diameter reduction, looseness due to spring-back will never occur. Moreover, after clamping the member to be clamped, diameter enlargement will never occur which is due to the elasticity of the member to be clamped for the pressure of a fluid passing inside the member.

In addition, since the band piece may have such a structure that it is opened at least one location so as to be capable of freely being applied and released, the clamping band may be applied after the member to be clamped has been connected to a pipe, etc.

As is obvious from the above description, the pesent invention may result in significant effects.

BRIEF DESCRIPTION OF THE DRAWINGS

Embodiments of the present invention will no be described by way of examples and with reference to the accompanying drawings, in which:

FIGS. 18 and 19 are partial sectional side views illustrating the state of diameter reduction for clamping bands of other embodiments;

DETAILED DESCRIPTION OF PREFERRED EMBODIMENTS

Preferred embodiments of the present invention will be described in detail by reference to the accompanying drawings.

Figure 1:
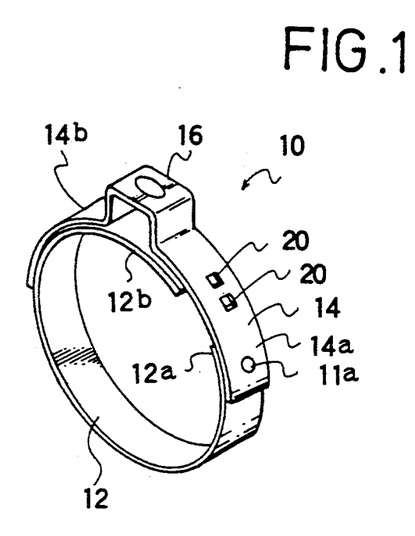
FIG. 1 is a perspective view of an embodiment of a clamping band of the present invetion.
Figure 2:
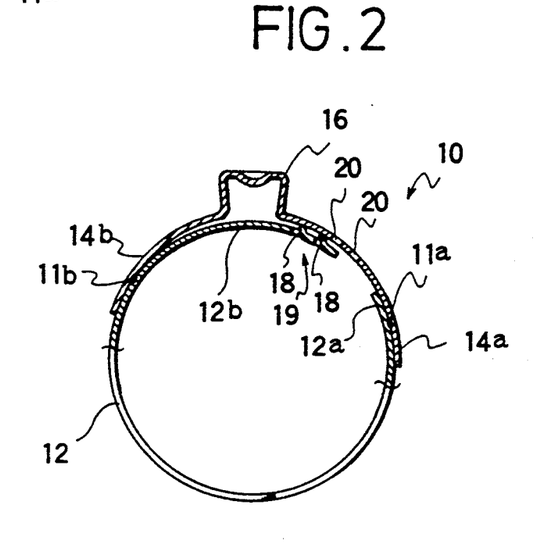
FIG. 2 is a partial sectional side view of the clamping band of FIG. 1.

FIG. 1 shows a perspective view of a clamping band of the present invention, and FIG. 2 shows a partial sectional side view.

The clamping band 10 shown in FIGS. 1 and 2 has a band portion 12 and a clamping portion 14.

The band portion 12 is made of a long metal belt-shaped band in the form of a ring.

On the other hand, the clamping portion 14 is overall in the form of an arc, and at the middle section thereof a clamping ear 16, bent in the form of a gate, is projected outwardly.

One end section 12a of the band portion 12 is spot-welded at a spot 11a on one end section 14a of the clamping portion 14. The clamping portion 14, with the clamping ear 16 at the middle thereof, is divided into two arc-shaped sections 14a and 14b.

The band portion 12 is overall rounded in the form of a ring, and the other end section 12b of this band portion 12 is overllaped with the inner side of the clamping portion 14, extending up to one arc-shaped portion 14a of the clamping portion 14.

The other end sectiion 12b of the band portion 12 positioned inside the other arc-shaped section 14b of the clamping portion 14 is spot-welded at a spot 11b on the other arc-shaped section 14b of the clamping portion 14.

Figure 3:
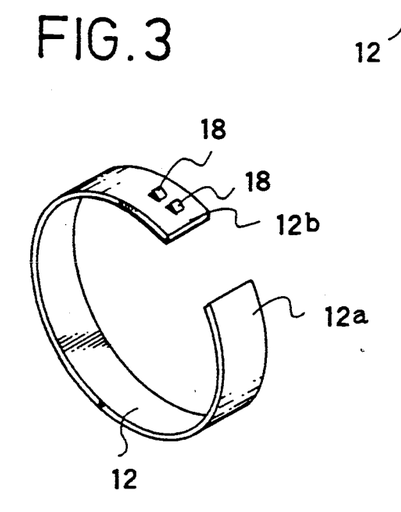
FIG. 3 is a perspective view of a band portion.

In the other end section 12b of the band portion 12 positioned inside the other arc-shaped section 14a of the clamping portion 14, there are catch nails 18 and 18 cut and bent up (see FIG. 3).

The positional relation is such that, when the clamping ear 16 of the clamping portion 14 gets deformed to reduce the diameter of the band portion 12 (see FIG. 4, where the clamping ear is in the deformed state), the catch nails 18 are brought into engagement with catch holes 20 bored in the arc-shaped section 14a of the clamping portion 14.

The clamping band 10 shown in FIGS. 1 and 2 is before being clamped. A member to be clamped is inserted into the clamping band 10 in this state and connected to a tubular body, etc., and then the clamping band 10 is positioned at this connection section to be reduced in diameter. Before the clamping band 10 is clamped, the catch nails 18 and 18 are out of engagement with the catch holes 20 and 20.

When in this state the clamping ear 16 is deformed, the end of one end section 12a of the band portion 12 approaches the end of the other end section 12b thereof, with a reduction in diameter of the clamping band 10. Then, the catch nails 18 and 18 on the other end section 12b of the band portion 12 engage with the catch holes 20 on one arc-shaped section 14a of the clamping portion 14 to keep the reduced-diameter state. Note that, since the band portion 12 is urged to enlarge its diameter by the elasticity of the member to be clamped, the catch nails 18 and 18 on the other end section 12b of the band portion 12 are kept in tight engagement with the catch holes 20 and 20 on the other arc-shaped section 14a of the clamping portion 14, thus maintaining the reduced-diameter state.

Under such a condition, when the clamping ear 16 is deformed, the reduced-diameter state of the clamping band 10 is kept, and clamping under the action of strong clamping force is affected, no diameter enlargement of the clamping band 10 being caused by spring-back.

Figures 4, 5A, 5B, 5C, 6:
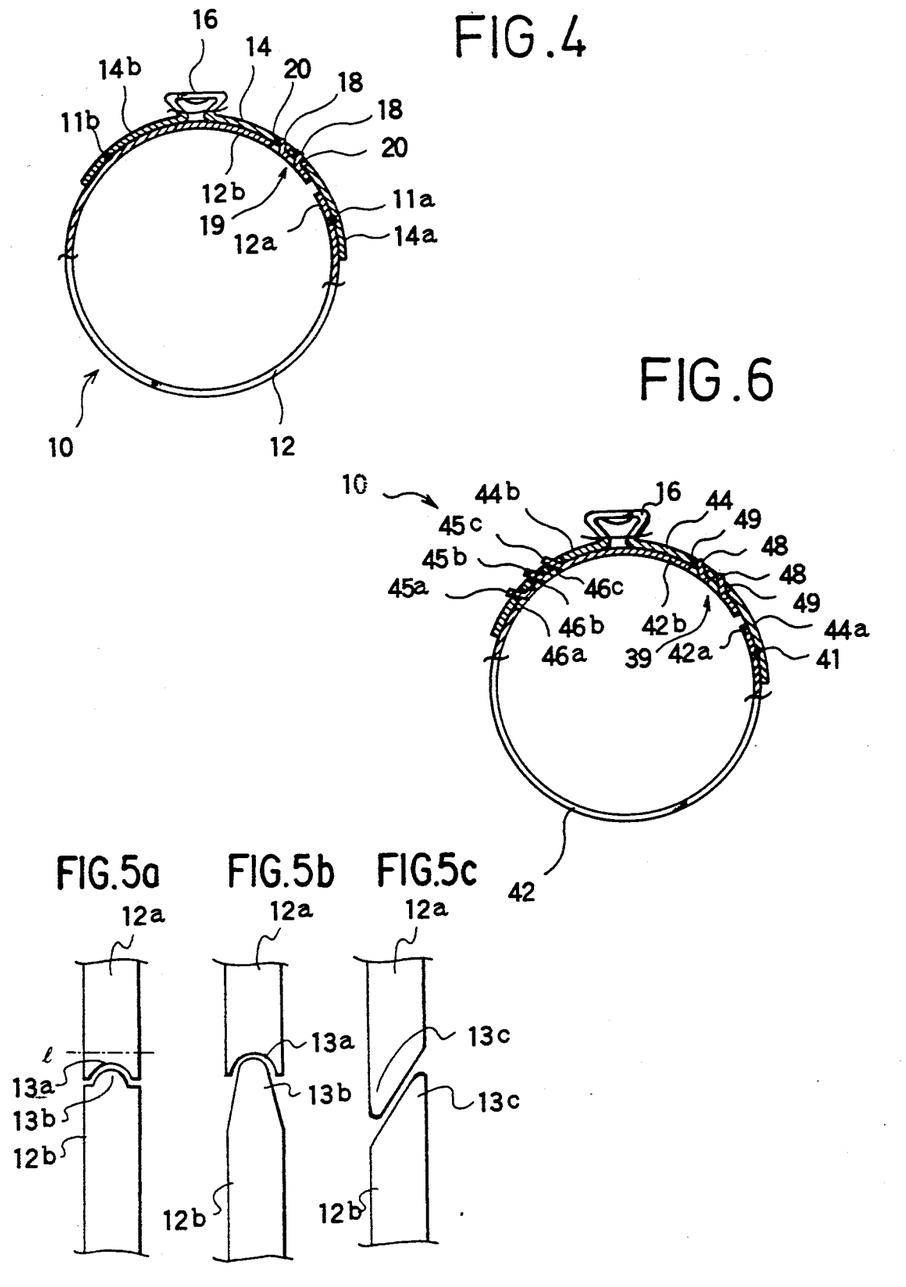
FIG. 4 is a partial sectional side view illustrating the state of clamping of the clamping band.
FIGS. 5(a)–(c) are explanatory drawings illustrating the state of approach of both ends of a band portion.
FIG. 6 is a partial sectional side view illustrating the state of diameter reduction of a clamping band of another embodiment.

In addition, prevention of the fluid in the tubing from leaking-out is possible if both the ends of the band portion 12 designed to approach each other are made not to have a gap in the axial direction when clamped. For example, as shown in FIGS. 5(a)–(c), effective structures are such that no gaps are made to exist in the axial direction 1. In FIGS. 5(a) and 5(b), one end is in the form of a semicircular notch 13a extending longitudinally and the other end is in the form of a narrow tongue piece 13b which may enter the inside of the notch 13a. In FIG. 5(c), both the ends are in the form of tongue pieces 13c and 13c whose facing edges get narrower outwardly to form slant edges, leaving no gaps in the axial direction 1.

Note that, in the above embodiments, the relation may be reversed between the catch nails 18 and 18 on the end section 12b of the band portion 12 and the catch section 19 in which the catch holes 20 and 20 are on one arc-shaped section 14a of the clamping portion 14. Also, no restriction is placed on the shape of the catch nails 18 and the catch holes 20; the catch nail 18 may be formed by means of caulking, etc.

Also note that, in this embodiment, the engagement section, which connects one arc-shaped section 14a with one end section 12a of the band portion 12, and the fixed section, which connects the other arc-shaped section 14b with the other end section 12b thereof are joined with each other by spot welding.

FIG. 6 shows another embodiment. The clamping band 10 in this embodiment has, similarly to the above embodiment, a clamping portion 44 and a band portion 42.

One end section 42a of the band portion 42 is spot-welded at a spot 41 is one arc-shaped section 44a of the clamping portion 44.

The clamping portion 44 is overall in the form of an arc and divided, with the clamping ear 16 positioned in the middle, into one arc-shaped section 44a and the other arc-shaped section 44b. The band portion 42 is overall rounded into a ring, and the other end section 12b of this band portion 42 is overlapped with the iner face of the clamping portion 44 and positioned inside the arc-shaped section 44a of the clamping portion 44.

The other end section 42b of the band portion 42 positioned inside the other arc-shaped section 44b of the clamping portion 44 is provided with a catch section 39 with which to make engagement with the other arc-shaped section 44b of the clamping portion 44. In the other end section 42b of the band portion 42, three catch nails 45a, 45b, and 45c are outwardly cut and bent out. And in the other arc-shaped section 44b of the clamping portion 44, there are bored catch holes 46a, 46b, and 46c with which the catch nails 45a, 45b, and 45c engage.

In the other end section 42b of the band portion 42 positioned inside one arc-shaped section 44a of the clamping portion 44, there is a catch nail 48 cut and bent up. And the positional relation is such that, when the clamping ear 16 of the clamping portion 44 gets deformed to reduce the diameter of the band portion 42, the catch nail 48 is engaged with a catch hole 49 bored in the arc-shaped section 44 of the clamping portion 44.

Namely, in the clamping band 10 of this embodiment, before diameter reduction the catch nails 45a, 45b, and 45c engage with the catch holes 46a, 46b, and 46c. In contrast, the catch holes 49 and 49 on the arc-shaped section 44a of the clamping portion 44 are out of engagement with the catch nails 48 and 48 on the end section 42b of the band portion 42.

Then, when the clamping ear 16 of the clamping band 10 is deformed to reduce the diameter, the catch holes 49 and 49 on the arc-shaped section of the clamping band 10 engage with the catch nails 48 and 48 on the end section 42b of the band portion 42, maintaining the clamped state.

Note that, in this embodiment, even after the member to be clamped has been connected to a pipe, etc., the clamping band 10 may be wound on the member to be clamped.

The catch section 39 is designed so that engagement is made between the catch holes 49 and 49 on one arc-shaped section 44a of the clamping portion 44 and the catch nails 48 and 48 on the other arc-shaped section 42b of the band portion 42. The engagement section is fixed by spot welding at the spot 41. The fixed section is constituted by an engagement structure constituted of the catch nails 45a, 45b, and 45c and the catch holes 46a, 46b, and 46c.

Another embodiment will be described by reference to FIGS. 7-10.

Figures 7, 8:
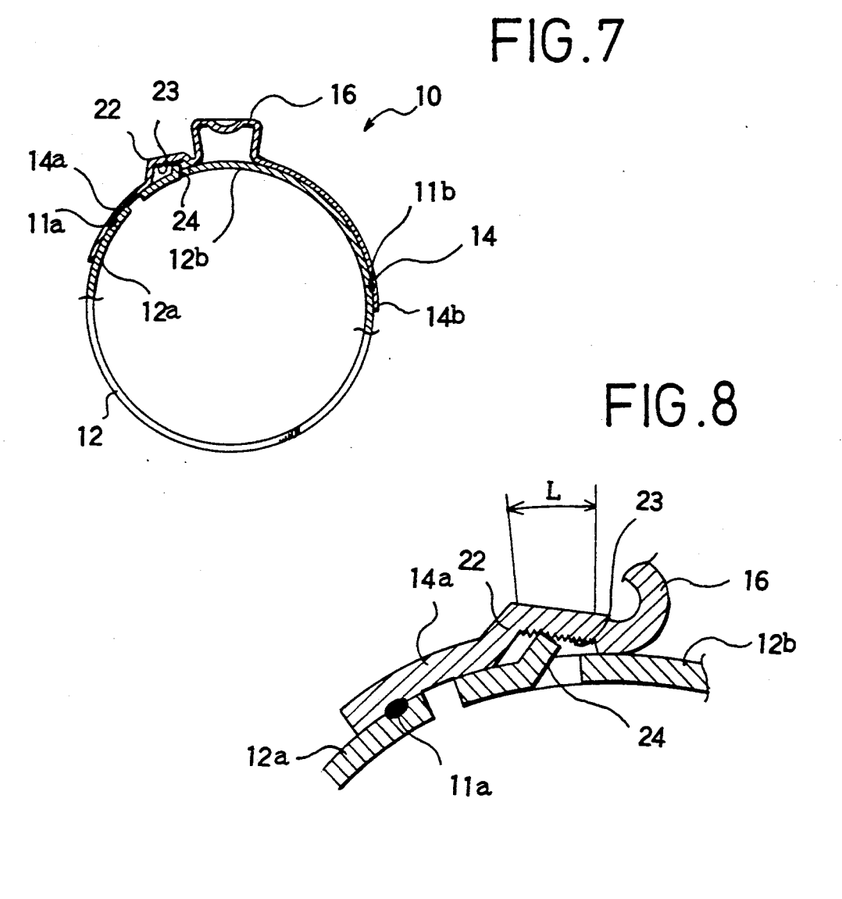
FIG. 7 is a partial sectional side view of another embodiment.
FIG. 8 is an explanatory view with an enlarged section for the catch section of the clamping band of FIG. 7.

The clamping band 10 in this embodiment also has, similarly to the above embodiment, a band portion 12 and a clamping portion 14.

The clamping portion 14, with the clamping ear 16 at the middle thereof, is divided into two arc-shaped sections 14a and 14b.

The band portion 12 is overall rounded in the form of a ring, and one end section 12a of the band portion 12 is spot-welded at a spot 11a on one arc-shaped section 14a of the clamping portion 14. The other end section 12b of the band portion 12 extends, along the inner side of the clamping portion 14, from the arc-shaped section 14b to the arc-shaped section 14a.

And the other end section 12b of the band portion 12 positioned inside the arc-shaped section 14b of the clamping portion 14 is spot-welded at a spot 11b on the arc-shaped section 14b of the clamping portion 14.

In the base section of the clamping ear 16 of the clamping portion 14 on the side of the arc-shaped section 14a, there is formed a projecting section 22 projecting outwardly. On the other hand, the other end section 12b of the band portion 12 has the catch nail 24 rising up, which enters the projecting section 22 to get in engagement with a group of notches 23. Before clamping the clamping ear 16 (diameter reduction), the catch nail 24 is positioned in the projecting section 22 on the side of the clamping ear 16. When the clamping ear 16 is deformed (diameter reduction), the catch nail 24 is moved gradually over the notches 23 in the direction for diameter reduction until the engagement state gets held at the clamping position.

Figure 9:
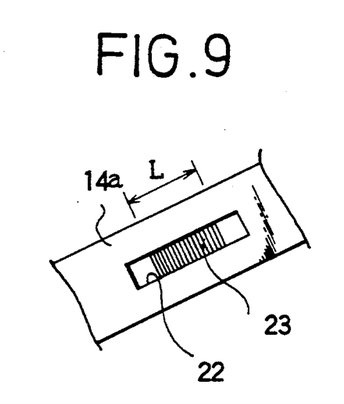
FIG. 9 is a bottom view of an indentation.
Figure 10:
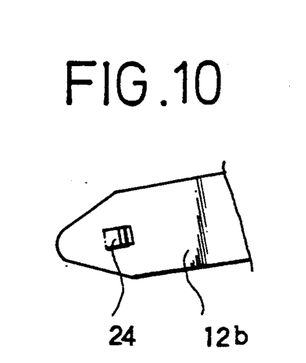
FIG. 10 is a plan view of the other end section of a ring piece.

In this embodiment, the group of notches 23 on the bottom plane in the projecting section 22 is formed over a length L so that the clamping strength of the clamping band 10 may be adjusted and imprecisions in the clamping band 10 as well as variations in the size of members to be clamped such as hose, etc. may be absorbed.

Figure 11:
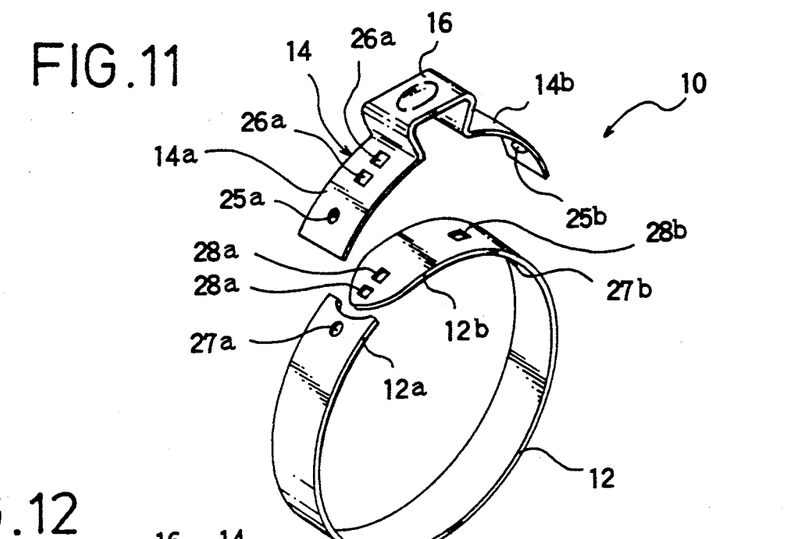
FIG. 11 is an exploded perspective view of a clamping band of another embodiment.
Figure 12:
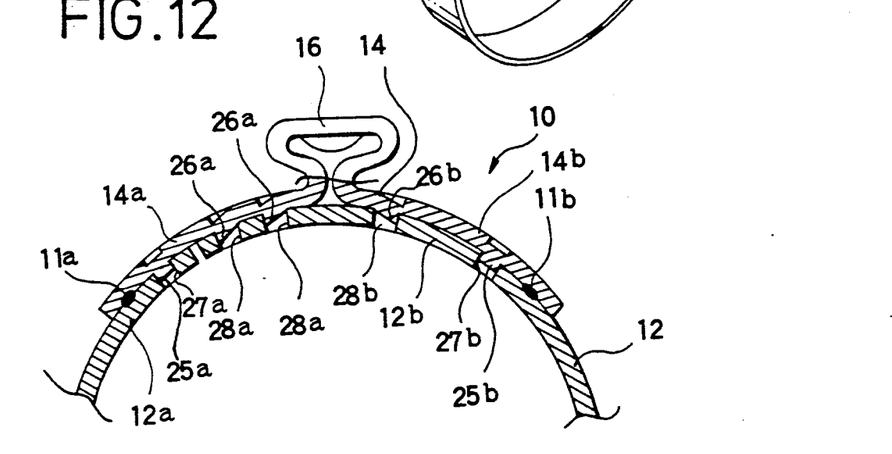
FIG. 12 is a partial sectional side view illustrating the state of diameter reduction of a clamping band of FIG. 11.

FIGS. 11 and 12 refer to still another embodiment.

The clamping band 10 in this embodiment also has, similarly to the above embodiments, the band portion 12 and the clamping portion 14.

The clamping portion 14, with the clamping ear 16 at the middle thereof, is divided into two arc-shaped sections 14a and 14b.

The band portion 12 is overall rounded in the form of a ring, with one end section 12a and the other end section 12b positioned close to each other. Both the end sections 12a and 12b are overlapped with the inner side of the clamping portion 14 in such a way that each front end of both the end sections 12a and 12b is on the side of the arc-shaped section 14a. And each front end of the arc-shaped sections 14a and 14b of the clamping portion 14 is spot-welded at spots 11a and 11b on the band portion 12. To effect this positioning, the arc-shaped sections 14a and 14b are provided with projections 25a and 25b, respectively, each projecting inwardly. Also, the base section of the clamping ear 16 of the clamping portion 14 is provided with two catch nails 26a and 26a on the side of the arc-shaped section 14a and one catch nail 26b on the side of the arc-shaped section 14b.

On the other hand, the band portion 12 is provided, at corresponding positions, with holes 27a and 27b to catch the projections 25a and 25b of the clamping portion 14. And the band portion 12 is provided with catch holes 28a, 28a, and 28b which catch the catch nails 26a, 26a, and 26b, respectively, of the clamping portion 14 when the clamping ear 16 is deformed to reduce in diameter the clamping band 10. Note that, before the clamping band 10 is reduced in diameter, the catch nails 26a, 26a, and 26b are out of engagement with the catch holes 28a, 28a, and 28b.

Therefore, when the clamping ear 16 of the clamping band 10 is deformed, the band portion 12 is reduced in diameter and at the same time the arc-shaped sections 14a and 14b of the clamping portion 14 come closer to each other and the catch nails 26a, 26a, and 26b engage with the catch holes 28a, 28a, and 28b, thus the reduced-diameter state being maintained.

Note that the catch nails 26a, 26a, and 26b and the projections 25a and 25b are formed by drawings.

Figure 13:
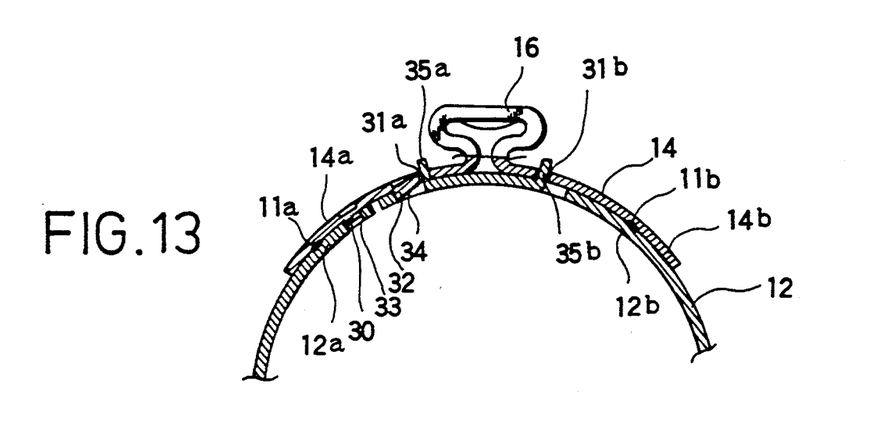

FIG. 13 refers to still another embodiment.

The clamping band 10 in this embodiment has, similarly to that in the embodiment shown in FIG. 11, the band portion 12 and the clamping portion 14.

Both the end sections 12a and 12b are overlapped with the inner side of the clamping portion 14 in such a way that each front end of both the end sections 12a and 12b is on the side of the arc-shaped section 14a. And each front end of the arc-shaped sections 14a and 14b of the clamping portion 14 is spot-welded at spots 11a and 11b on the band portion 12. To effect this positioning, the arc-shaped section 14a is provided with a projection 30 projecting inwardly. Also, the base section of the clamping ear 16 of the clamping portion 14 is provided with a catch hole 31a and a catch nail 32 on the side of the arc-shaped section 14a and a catch hole 31b on the side of the arc-shaped section 14b of the clamping portion 14.

On the other hand, the band portion 12 is provided with a hole 33 to catch the projection 30 of the clamping portion 14. And the band portion 12 is provided with a catch hole 34 which catches the catch nail 32 when the clamping ear 16 is deformed to reduce in diameter the clamping band 10. This catch nail 34 is formed by cutting and bending up a nail piece 35a. The nail piece 35a engages with the catch hole 31a while the clamping band 10 is in the reduced-diameter state. A nail piece 35b, formed similarly, engages with a catch hole 31b while the clamping band 10 is not reduced in diameter, and serves also for positioning for the spot welding at spots 11a and 11b.

Figure 14:
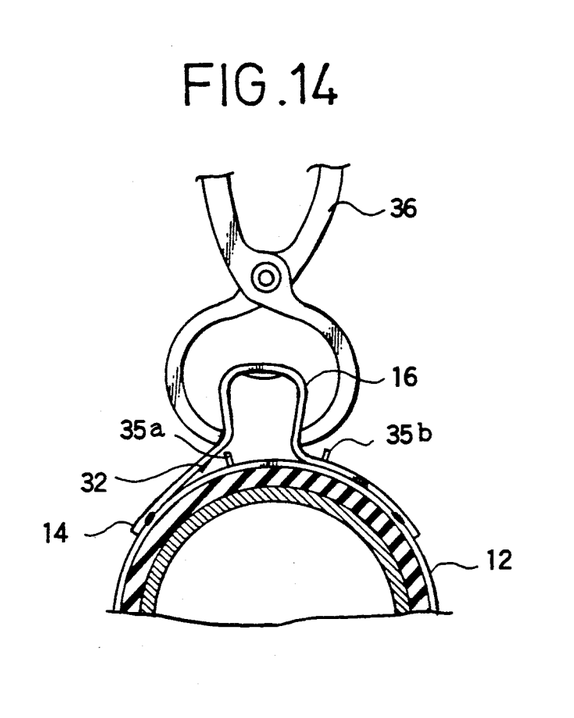
FIG. 14 is a side view illustrating the state of clamping for the clamping band of FIG. 13.

Note that, when the clamping ear 16 is deformed with a tool 36 like a pair of pinchers, the clamping ear 16 first assumes a state of floating up (see FIG. 14) and comes into tight contact with the band portion 12 as the deformation further proceeds (see FIG. 13).

Figure 15:
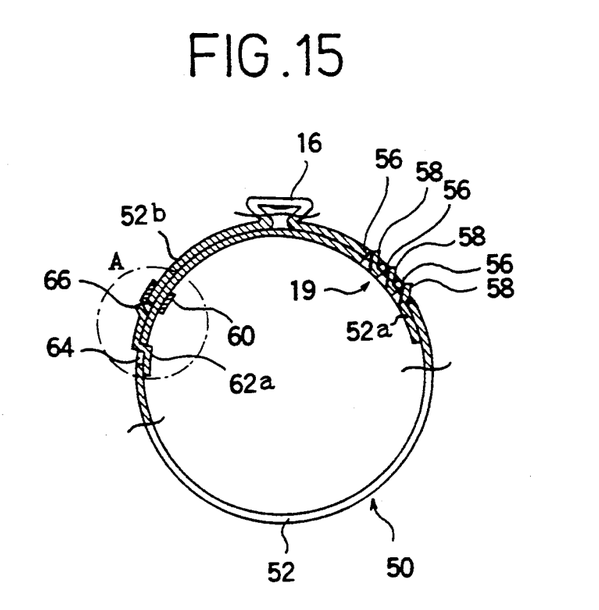
FIG. 15 is a partial sectional side view illustrating the state of diameter reduction for the clamping band of another embodiment.
Figure 16:
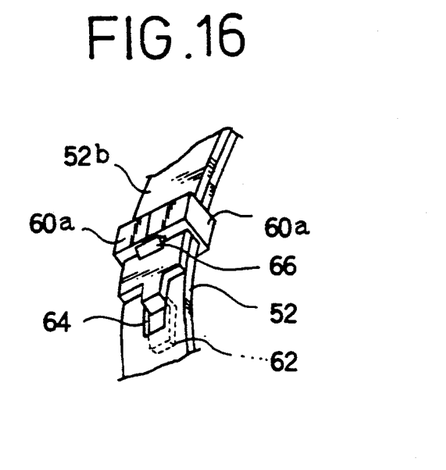
FIG. 16 is a partial perpective view illustrating elemental sections of the clamping band of FIG. 15.

FIG. 15 shows a partial sectional side view of a clamping band of further still another embodiment. FIG. 16 shows a perspective view of the section surrounded by the circle A in FIG. 15.

A clamping band 50 of this embodiment has one band piece 52. The band piece 52 is formed in a ring, an inner band section 52a extending along the inner side of an outer band section 52b and being overlapped therewith.

Approximately in the middle of the outer ring-shaped band section 52b of the band piece 52, there is a clamping ear 16 which is bent outwardly in the form of a gate.

On the side of the inner band section 52b closer to the end thereof than the clamping ear 16 of the band piece 52, there are formed catch holes 56. Three catch nails 58 to engage with these catch holes 56 are formed along the outer circumference of the inner band section 52 of the band piece 52 so as to form a catch section 19.

On the other hand, the outer band section 52b of the band piece 52 is prevented by a metal retainer 60 from having the end section thereof floating up. The whole of this metal retainer 60 is of U shape, and projecting parts 60a and 60a of the metal retainer 60 extend outwardly. These projecting parts 60a and 60a are bent after the outer band section 52a of the band piece 52 has been laid thereon and guide the outer band section 52b.

Figure 17:
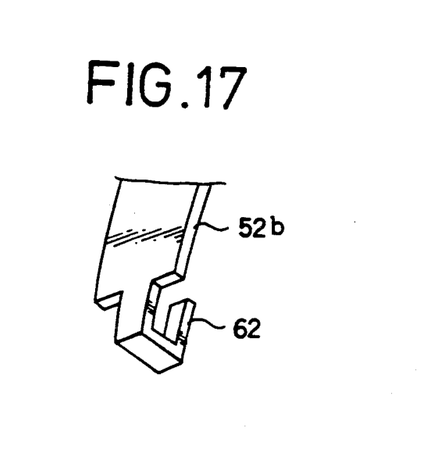
FIG. 17 is a perspective view illustrating the end of a band portion.

At the end of the outer band section 52b of the band piece 52 there is formed a narrow catch part 62. The catch part 62 is bent in a form of steps, enters a through-hole 64 bored at the position corresponding to the band piece 52, and extends along the inner side of the band piece 52. The catch part 62 prevents the outer band section 52b of the band piece 52 from floating up.

Also, on the outer band section 52b of the band piece 52, there is formed a bent-up catch projection 66 at a location closer to the end than the metal retainer 60.

In the clamping band 10 of this embodiment, before diameter reduction the metal retainer 60 catches the catch projection 66 and the catch part 62 enters the through-hole 64 to be fixed. On the other hand, the catch nails 52 are out of engagement with the catch holes 56, engaging therewith upon diameter reduction of the clamping band 10.

The clamping band 10 of this embodiment is applied on a member to be clamped and clamps it by having the clamping ear 16 deformed to effect diameter reduction.

Note that in the above embodiment, the catch part 62 may be formed by being folded into a U shape. Also, the front end entering the inside of the catch part 62 may be formed thin-walled so as not to yield a step.

Figure 18:
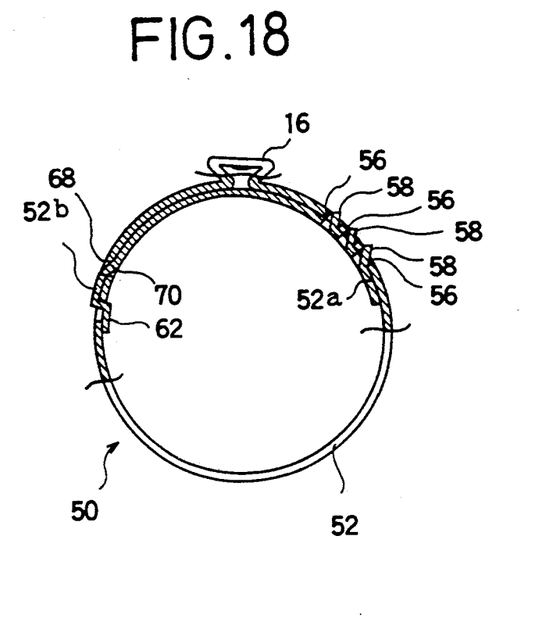
FIG. 18 is a partial sectional side view of a clamping band of another embodiment.

FIG. 18 shows another embodiment.

In this embodiment, the outer band section 52b of the band piece 52 is provided with a through-hole 68, and a catch projection 70 to engage with this through-hole 68 is provided on the inner band section 52a positioned inside the band piece 52 at a location corresponding to the outer band section 52a. The other parts are constructed similarly to those of the above embodiment, resulting in similar functions and effects.

Figure 19:
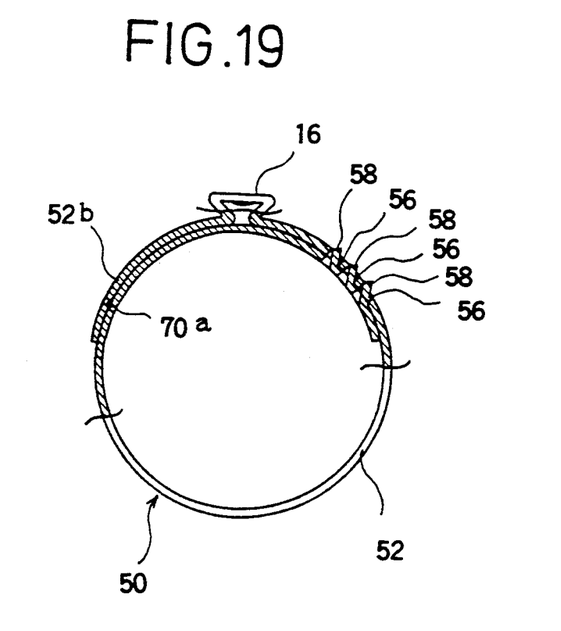

FIG. 19 shows another embodiment.

The front end of the outer band section 52b of the band piece 52 is fixed on the outer circumference of the band piece 52 by spot-welding at a spot 70a. This embodiment is simple in structure.

Figure 20A:
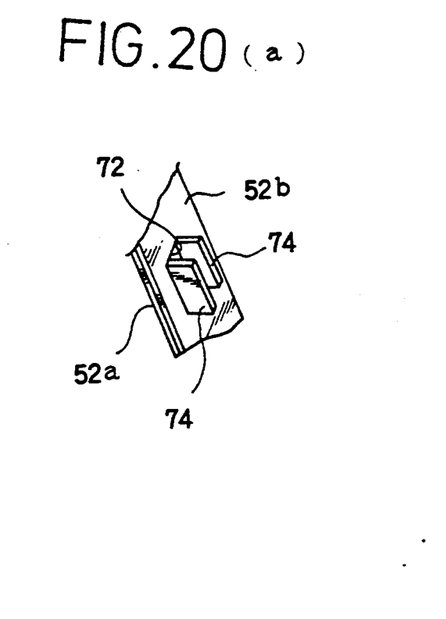
FIG. 20(a) is a partial perspective view of a catch section.
Figure 20B:
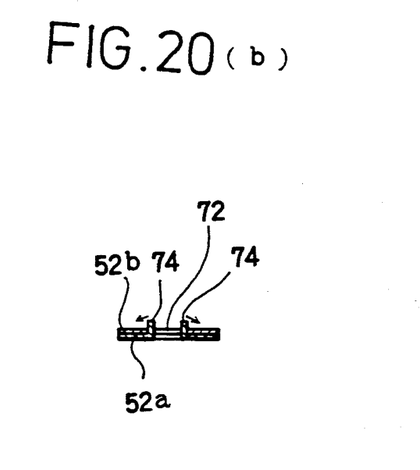
FIG. 20(b) is a sectional view of the catch section.
Figures 21A, 21B:
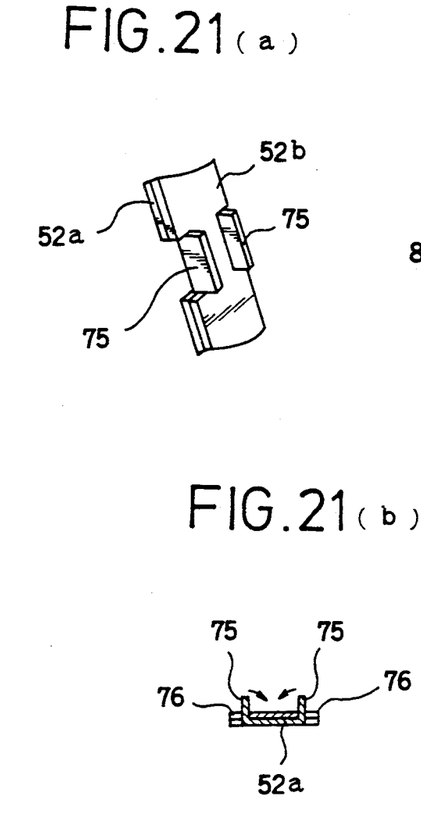
FIG. 21(a) is a partial perspective view of a catch section.
FIG. 21(b) is a sectional view of the catch section.

FIGS. 20 and 21 show a catch section when the band piece 52 is reduced in diameter.

As shown in FIGS. 20(a) and (c), a rectangular through-hole 72 is bored at the base section of the clamping ear 16 on the outer band section 52b, and on the inner band section 52a there are provided projecting parts which engage when the band piece 52 is reduced in diameter. These projecting parts 74 and 74 have been formed by making cuts in the circumferential direction in the inner band section 52a and raising them up so that they open from the middle in the direction toward the surface.

When the projecting parts 74 and 74, while in engagement with the through-hole 72 on the outer band section 52b, are further thrown outwardly, the engagement state of the outer band section 52b may be maintained and the floating-up thereof may be prevented (see FIG. 21(b)).

FIGS 21(a) and (b) show modified embodiments of the embodiment shown in FIG. 20.

In this embodiment, the projecting part 74 is replaced by a projecting part 75 which has been formed by cutting and bending up part of the side edge section of the inner band section 52a in the direction toward the surface.

In addition, for the projecting parts 75 and 75 to engage, notches 76 and 76 are formed on the corresponding side edge section of the outer band section 52b.

When the clamping ear 16 is deformed to reduce the clamping band 10 in diameter, the projecting parts 75 and 75 on the inner band section 52a engage with the notches 76 and 76 on the outer band section 52b. In this state the projecting parts 75 and 75 are thrown inwardly (see FIG. 21(b)), and the engagement state of the outer band section 52b may be maintained and the floating-up thereof may be prevented.

Figure 22:
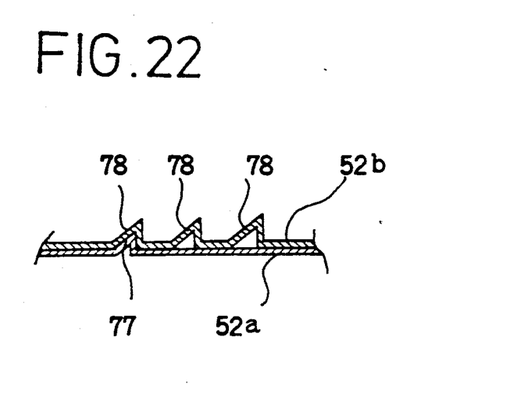
FIG. 22 is an explanatory side view of the catch section.

FIG. 22 shows another structure of catch section. In this embodiment, on the inner band section 52 a projection 77 is formed projecting in the direction toward the surface. A projecting section 78, with which this projection 77 engages, projects on the inner side of the outer band section 52b toward the outer side. A plurality of projecting sections 78 are formed on the outer band section 52b.

Therefore, when the clamping ear 16 is deformed to reduce the clamping band 10 in diameter, the projection 77 engages sequentially with the projecting sections 78 of the outer band section 52b until it is fixed at a position of suitable clamping strength. Thus, the clamping strength may be adjusted.

Figure 23:
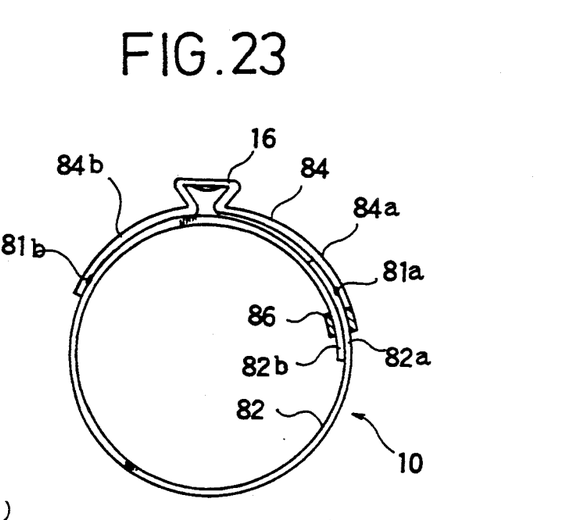
FIG. 23 is a partial sectional side view illustrating the state of diameter reduction for a clamping band of another embodiment.

FIG. 23 shows still another embodiment.

This clamping band 10 has a band portion 82 and a clamping portion 84 with a clamping ear 16. Both the ends of the band portion 82 are overlapped with each other, and the outer side section 82a is spot-welded at a spot 81a onto the inner side of one arc-shaped section 84a of the clamping portion 84. And the section of the band portion 82, in contact with the inner side of the other arc-shaped section 84b of the clamping portion 84, is subjected to a spot-welding at a spot 81b.

In addition, the overlapping portion between the overlapped portion of the band portion 82 and the other arc-shaped section of the clamping portion 84 is provided with a ring metal retainer 86 fixed on the inner side section 82b of the band portion 82.

When the clamping ear 16 of this clamping band 10 is deformed for diameter reduction, the front end of the inner side section 82b of the band portion 82 is made to advance forward. And, when the metal retainer has moved to a position beyond the front end of the other arc-shaped section 84a of the clamping portion 84, the metal retainer 86 is deformed with a hammer, etc. Then, the metal retainer 86 comes into engagement with the front end of the other arc-shaped section 84a of the clamping portion 84, thereby diameter enlargement being hindered.

It is obvious from the above-described various embodiments that the same structure is applicable with the clamping portion and the band portion made either separate via the catch section or unified.

The present invention, which has been described in detail by reference to suitable embodiments, is of course not limited to the above-described embodiments but may be subject to a number of modifications within the scope not deviating from the spirit of the invention.

What is claimed is:

1. A metallic clamping band comprising a band portion formed in a ring comprising an inner band section having two ends and an outer band section having two ends, a portion of each of the outer band sections including the respective ends thereof overlapping corresponding portions including the respective opposite ends thereof of the inner band section, means attaching the overlapping portions of the outer and inner band sections to each other, a clamping ear provided in a middle portion of the outer band section and bent outwardly in a form of a gate, a catch section comprising first catch means formed on the outer band section between the ear and one of said overlapping portions and second catch means adapted to engage the first catch means and formed on the inner band section between the ear and the first catch means so that said first and second catch means are angularly offset from each other when the ear is undistorted and are brought into registry with each other and thereby engage each other when the ear is pinchingly distorted to reduce the diameter of the band portion.

2. A metallic clamping band according to claim 1, wherein one of the first and second catch means comprises a catch nail and the other of the catch means comprises a catch hole.

3. A metallic clamping band according to claim 1, wherein the attaching means are means detachably attaching at least one pair of the overlapping portions to each other.

4. A metallic clamping band according to claim 1, wherein the attaching means are means not-detachably attaching at least one pair of the overlapping portions to each other.

5. A metallic clamping band according to claim 1, in which the inner band section is so formed that edges of the ends thereof meet without a gap when the first and second catch means are in mutual engagement.

* * * * *